United States Patent [19]

Bodensieck

[11] 4,027,930
[45] June 7, 1977

[54] BEARING ASSEMBLY AND METHOD

[75] Inventor: Ernest J. Bodensieck, Scottsdale, Ariz.

[73] Assignee: The Garrett Corporation, Los Angeles, Calif.

[22] Filed: Dec. 19, 1975

[21] Appl. No.: 642,510

[52] U.S. Cl. .................................. 308/202; 308/216
[51] Int. Cl.² ......................................... F16C 19/00
[58] Field of Search ................... 308/202, 216, 217

[56] References Cited

UNITED STATES PATENTS

| 3,582,164 | 6/1971 | Derner | 308/217 X |
| 3,628,839 | 12/1971 | Vannest | 308/217 |
| 3,659,912 | 5/1972 | Scheitele | 308/217 |
| 3,951,483 | 4/1976 | Nakamura | 308/202 X |

Primary Examiner—Joseph F. Peters, Jr.
Assistant Examiner—Gene A. Church
Attorney, Agent, or Firm—James W. McFarland; Albert J. Miller

[57] ABSTRACT

An antifriction roller bearing assembly having bearing members rolling in a depressed raceway of a circular inner race which has upstanding end flanges engagable with end faces of the bearing members. The end flanges on the race are circularly curved to present a convex surface engaging the bearing end faces in such a manner as to maintain a hydrodynamic fluid film between the location of contact of the end face with the adjacent end flange.

15 Claims, 12 Drawing Figures

BEARING ASSEMBLY AND METHOD

BACKGROUND OF THE INVENTION

This invention relates to antifriction roller bearing assemblies, and relates more particularly to improvements therein preventing roller end wear.

Antifriction bearing assemblies generally comprise inner and outer circular races between which are disposed a plurality of roller bearing members in rolling engagement with the inner and outer races. conventionally, end flanges are included in one or both of the inner and outer races, and the end faces of the bearing members are engagable with these end flanges. This engagement has drastically limited the life, and predictability of life, of prior art antifriction roller bearing assemblies. Manufacturing tolerances ultimately cause the roller bearings to become sufficiently skewed within the raceway of the inner and outer races such that line to line contact ultimately occurs between the end face of the roller bearing and the upper corner of the race end flange. Occurrence of this line to line contact varies relative to the manufacturing tolerances involved, thus leading to unpredictability of roller bearing life. This problem is particularly deleterious in extremely high speed roller bearing applications such as the roller bearings utilized on mainshafts in gas turbine engines.

While various arrangements have been contemplated to reduce roller bearing end wear, such as crowned roller bearing ends, and/or tapered race end flanges, the problems of roller bearing end wear and resultant unpredictability in roller bearing life still is prevalent particularly with respect to high speed applications.

More particularly, the primary failure in cylindrical roller bearings used in high speed applications is induced by the roller bearing end wear. Such wear causes the loss of control of the roller bearing, fatigue loading of the separator utilized to separate adjacent roller bearings, fracture of the separator, magnified skidding of the roller upon the race and subsequent complete bearing failure.

Roller end wear occurs primarily whenever the roller end contacts the guide flange of the race under conditions where the oil film thickness is less than that required to separate the surface asperities. The wear is especially severe if the roller end contacts the top or outer corner of the flange to wipe the oil film from the roller end and further promote metal-to-metal contact. The wear rate increases further if the corner of the end of the roller contacts the outer corner of the race end flange. This corner-to-corner contact is prevalent to one extent or another in substantially all roller bearings manufactured today. Such roller end wear is relatively random in nature as it depends on blend radii and wear-in that affect skewing torques exerted upon the roller bearing. Roller skewing moments are essentially a result of imperfect and imprecise manufacturing, as well as the necessary manufacturing tolerances. The flange end and roller end must be capable of reacting and withstanding the maximum roller skewing moment which occurs when the roller skewing absorbs all of the end clearance between the roller and the guide flanges of the race. Exemplary of those manufacturing tolerances which assist in producing roller skewing moments include raceway taper, roller cylindrical surface taper, roller crowning variations, and off-square roller ends.

Prior attempts to achieve and improve lubrication between the roller end and the race guide flange in high speed cylindrical roller bearing designs incorporate various arrangements which are difficult and expensive to control and do not successfully obtain the desired results. Such prior art arrangements include blending of surfaces at the intersections of the corner of the end of the roller bearing, as well as blending of surfaces at the outer corner of the race guide flange, centrifugally fed lubrication ports in the raceway itself adjacent the base of the race end flanges, and dynamic mass balancing of each individal roller. As a practical matter, such arrangement are not consistently attainable, are relatively extremely expensive, and still result in unreliable bearing installation in spite of high bearing cost.

SUMMARY OF THE INVENTION

It is a primary object of the present invention to provide improved antifriction bearing assembly structure and method which provides greatly improved bearing life and predictability of bearing life by substantially reducing and controlling roller bearing end wear.

More particularly, the present invention accomplishes the preceding object by assuring adequate hydrodynamic fluid film lubrication of the roller bearing end substantially reduce roller bearing end wear, and which structure and method substantially eliminates contact of the roller end with the sharp corner on the guide flange of the race.

In summary, the invention contemplates a roller bearing raceway having upstanding end flanges for engagement with the adjacent ends of roller bearing members, wherein the end flanges have convex surfaces of a pre-selected radius of curvature for engagement with the adjacent roller bearing end faces. The roller bearing end faces may either be flat or crowned. The convex surface configuration assures that the end of the roller bearing never contacts the outer corner of the end flange, and also establishes a wedge shaped space above the location of contact between the bearing end face and the convex surface. The arrangement of the roller bearing assembly is such that rolling movement of the bearings upon the raceway forces lubricating fluid into this wedge shaped space to assure maintenance of a hydrodynamic fluid film between the end face and the adjacent convex surface at the location of contact.

These and other objects and advantages of the present invention are specifically set forth in or will become apparent from the following detailed description of preferred forms of the invention when read in conjunction with the accompanying drawings.

DETAILED DESCRIPTION OF THE PREFERRED EMBODIMENTS

Figure 1:
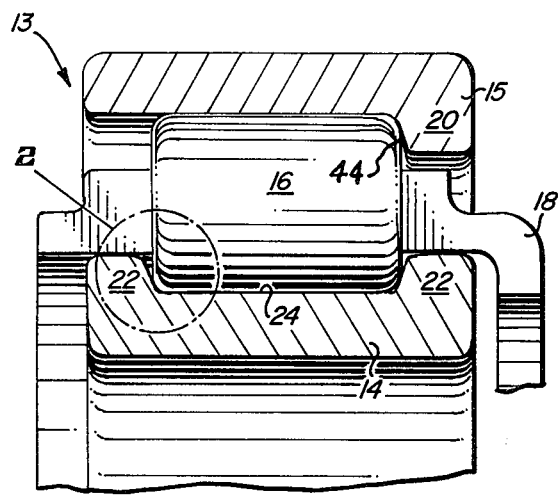
FIG. 1 is a fragmentary cross-sectional view of an antifriction roller bearing assembly as contemplated by the present invention.
Figure 2:
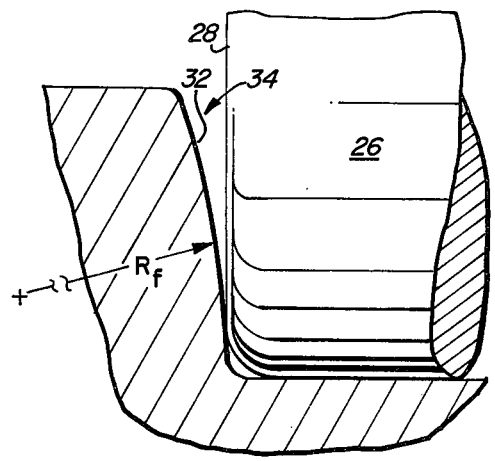
FIG. 2 is an enlarged cross-sectional view of the end flange portion of the inner raceway.
Figure 3:
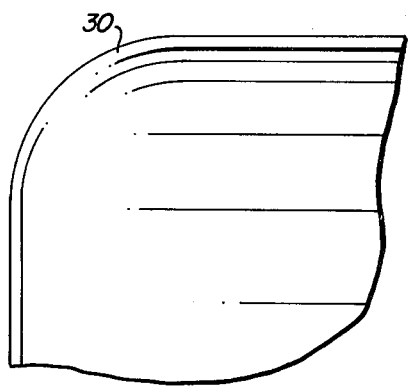
FIG. 3 is a further enlarged, fragmentary view of the corner of the roller bearing.

Referring now to the drawings and more particularly to FIGS. 1–6, an antifriction roller bearing assembly generally denoted by the numeral 13 includes a circular, inner bearing race 14, and outer, circular, concentrically arranged race 15, a plurality of cylindrical roller bearing member 16 disposed between the races, and a separator 18 which spaces the individual roller members about the concentric inner and outer races. Outer race 15 has an upstanding end flange portion 20, and inner race 14 has a pair of opposed upstanding end flanges 22 defining a depressed raceway surface 24 therebetween.

Each bearing member 16 has an axially extending cylindrical surface 26 of a width slightly less than the width of raceway 24, and opposed, flat end faces 28 substantially perpendicular to raceway 24. The intersections of each end face 28 with the cylindrical surface 26 is a smoothly rounded corner 30 as clearly illustrated in FIG. 3. Upstanding flanges 22 on inner race 14 are of a height substantially less than the radius of cylindrical roller bearing 26.

Each end flange 22 presents a surface 32 arranged in engagable relationship with the adjacent end face 28 of the roller bearing. Surface 32 is convexly formed, preferably crowned with a radius of curvature relatively large with respect to the diameter of roller bearing 26. Preferably surface 32 is formed with a radius of curvature of between approximately 3 inches and 20 inches, most suitably approximately five inches. The configuration of the surface 32 substantially reduces wear on end face 26 of the roller bearing as described below, due to the wedge shaped space 34 established between the upper portion of surface 32 and end face 28.

Figure 4:
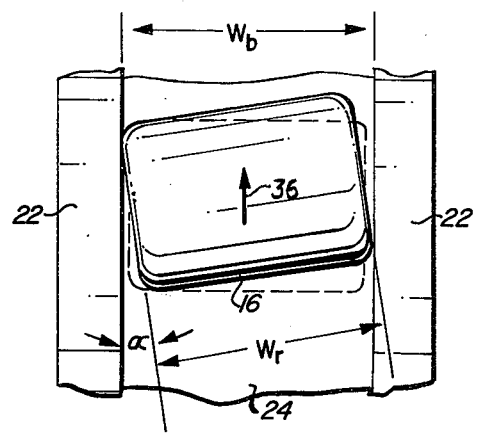
FIG. 4 is a top plan view of the roller bearing and inner raceway.

In operation, the entire antifriction bearing assembly is conventionally arranged in a bath of lubricating fluid. Bearing members 16 roll within raceway 24, spacer 18 acting to space the individual rollers about the periphery of the co-axial races. Because of the difference between the axial width of the raceway 24 and the slightly smaller width of bearing members 16, each roller 16 assumes a slightly skewed disposition as illustrated in FIG. 4, with the bearing member disposed at a skew angle "$\alpha$" relative to the direction of movement illustrated by arrow 36 in FIG. 4. The convex curvature of end face surface 32 also affects the skewing angle $\alpha$.

As a result of this skewing, the leading location of contact 40 in the direction of movement of each bearing member 16 is between one of its end faces 28 and the adjacent end flange surface 32 of one of the raceways. The convex curvature of surface 32 assures appropriate lubrication at location 40. More particularly, the radius of curvature, $R_f$, of surface 32 is predetermined such that the location of contact 40 is below the outer corner 37 of the end flange surface 32 by a distance "x", preferably about one-third of the height of flange surface 32, and preferably inwardly from the outer rounded corner 30 of the bearing at a radius $R_c$ as clearly illustrated in FIGS. 5 and 6. By such appropriate curvature of surface 32, according to the formulas given below, it is assured that the wedge shaped area 34 is maintained between the end face and convex surface 32:

$$2\ R_f = \frac{[R_o - R_i - \chi]^2 + [K \tan \alpha - \frac{1}{2}(W_b - W_r)]^2}{K \tan \alpha - \frac{1}{2}(W_b - W_r)}$$

Where:

$$K = \frac{1}{\frac{1}{2}(R_i + R_r)} \sqrt{[(R_o - \chi)^2 - (R_i + R_r - R_c)^2][(R_i + R_r + R_c)^2 - (R_o - \chi)^2]}$$

and:

$R_f$ = radius of curvature of surface 32
$R_i$ = inner radius of curvature of race 14
$R_o$ = outer radius of curvature of race 14
$R_r$ = radius of bearing 16
$R_c$ = radius to location of contact 40
$\chi$ = distance from top of flange 22 to location of contact 40
$\alpha$ = skew angle
$W_r$ = width of roller 16
$W_b$ = 0 width of raceway 24

Figure 5:
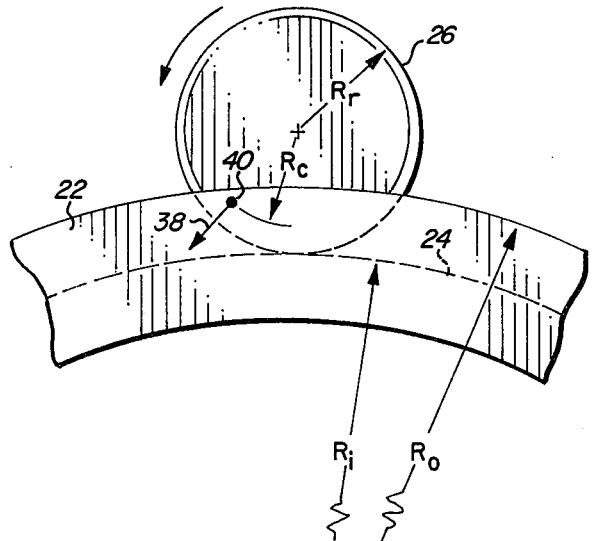
FIG. 5 is an end view of the roller bearing and inner race.

The wedge shaped space 34 is so relatively located that the instantaneous relative velocity of the roller end face 28 to convex surface 32 is in a direction illustrated by arrow 38 in FIG. 5. Accordingly, the instantaneous relative velocity adjacent the space 34 includes a downward component such that rotation of cylindrical bearing 16 forces lubricating fluid into the wedge shaped space and towards the location of contact 40. Because space 34 converges towards contact location 40, lubricating fluid is forced inwardly onto the location of contact to establish and maintain a hydrodynamic lubricating fluid film between the bearing surface 28 and the adjacent convex surface 32 throughout operation of the roller bearing.

Figure 6:
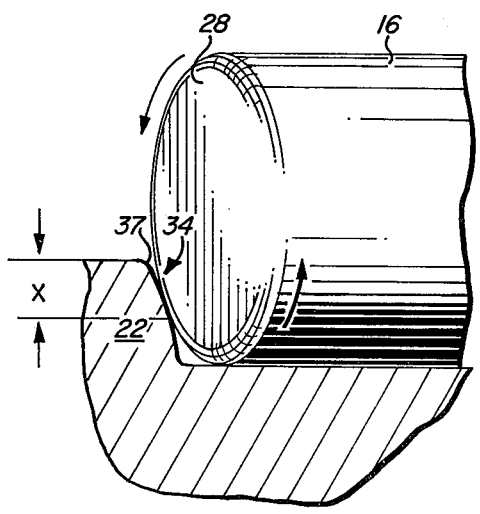
FIG. 6 is a view similar to FIG. 2 but showing the roller bearing in its normal, skewed disposition.
Figure 7:
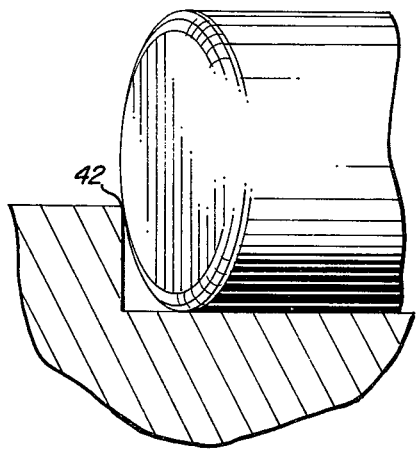
FIG. 7 is a view similar to FIG. 6 but showing prior art structure.
Figure 8:
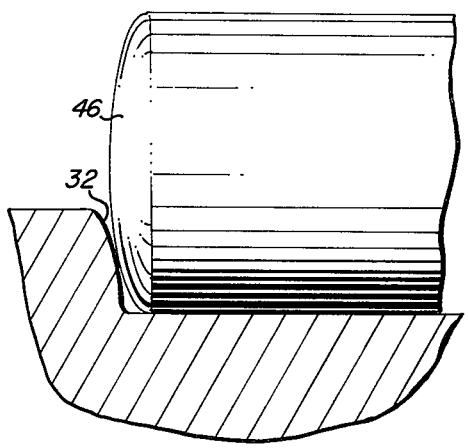
FIG. 8 is an enlarged, fragementary, partially cross-sectional view of the end flange area of another embodiment of the invention.
Figure 9:
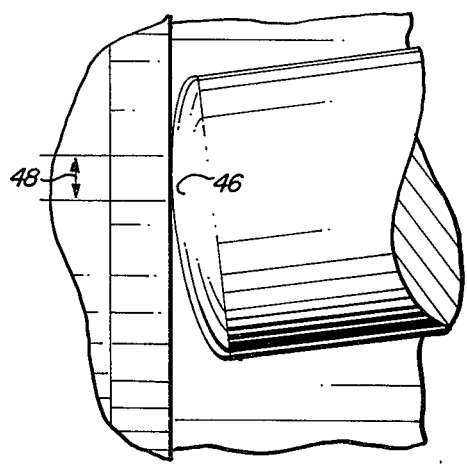
FIG. 9 is an enlarged, partial plan top view of the roller bearing and race of FIG. 8.
Figure 10:
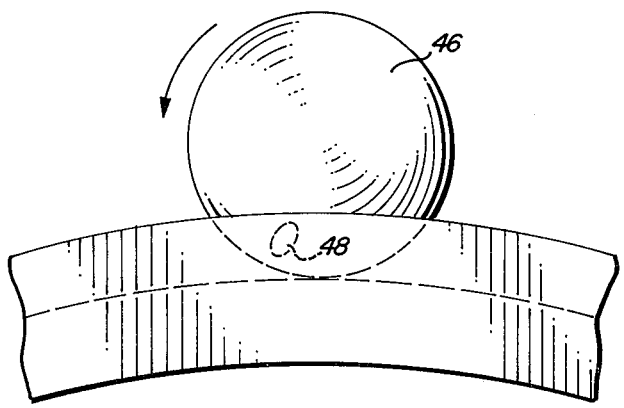
FIG. 10 is an end view of the roller bearing and race of FIG. 8.
Figure 11:
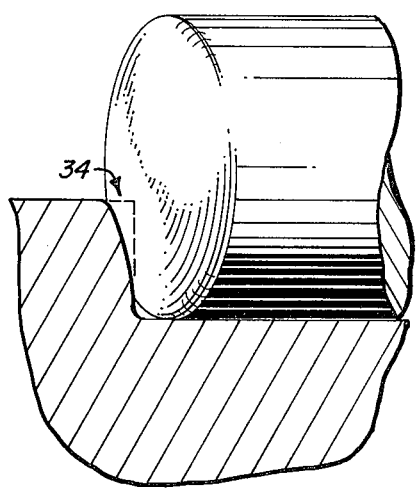
FIG. 11 is a view similar to FIG. 8 but showing the roller bearing in its normal, skewed disposition.

The improved operation of the present invention can be clearly understood by comparison of FIG. 6 to the prior art arrangement shown in FIG. 7. As apparent from FIG. 7, the skewed disposition of a roller bearing 16 causes the roller end face either immediately or ultimately to contact the outer corner 42 of an adjacent upstanding end flange on a raceway. By virtue of contact with this outer corner, no wedge shaped space equivalent to space 34 is established. Rotation of the roller 16 then causes its end face to wipe dry the location of contact to promote damaging metal-to-metal contact. While certain prior art approaches have attempted to alleviate this problem by providing a slanted contact surface on the end flange similar to the slanted surface 44 on the outer race 15 of FIG. 1, such approach still does not solve the end wear problem in many instances because the roller, due to initial manufacturing tolerances and/or subsequent wear, will ultimately contact this outer corner 42 to promote the damaging metal-to-metal contact. Similarly, it is unfeasible to provide a crown on the end on end surface 28 of the roller bearing of sufficiently small radius of curvature to maintain a wedge-like space above the location of contact with a flat end flange surface.

Figure 12:
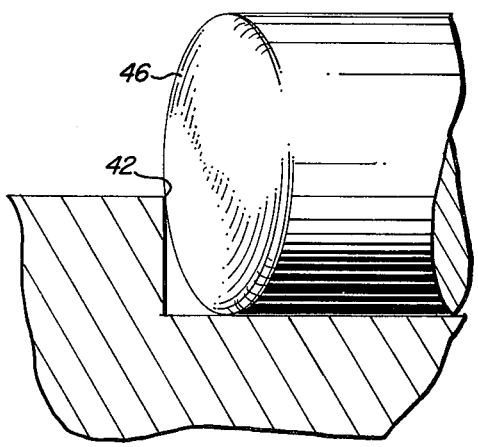
FIG. 12 is a view similar to FIG. 11 but showing prior art structure.

Another form of the invention is illustrated in FIGS. 8–11. In this arrangement, the roller bearing end surface 46 is crowned rather than flat as face 28 of the FIG. 1 embodiment. A slight crowning of end face 46 further enhances roller bearing life since now there are two convex surfaces in engagement with one another. As a result, the location of contact is a relatively larger elliptically shaped area 48. As in the previous embodiment, the flange surface 32 is convexly formed with a preselected radius of curvature to produce the desired wedge shaped space 34 above the location of contact 48 such that the relative instantaneous velocity of the cylindrical roller bearing causes it to force lubricating fluid flow inwardly towards the location of contact 48 while rolling upon the inner raceway to thereby produce the hydrodynamic lubricating fluid film between the end face 46 and adjacent convex surface 32 at the location of contact 48. In comparison to prior art structure illustrated in FIG. 12 wherein a convex surface 46 is incorporated in the cylindrical roller bearing but acting against a straight, non-convexly curved end face of a raceway, the same deleterious resulted occurs. The roller bearing end face will ultimately or immediately contact the outer corner 42 of the raceway to cause wiping of any lubricating fluid and promotion of metal-to-metal contact.

From the foregoing it will be apparent that the present invention provides an improved method of reducing wear between the end face of a roller bearing 16 and the adjacent surface 32 of an upstanding end flange on the race which includes the steps of establishing the inwardly converging wedge shaped space 34 between the end face and surface 32. The wedge shaped space is maintained during rolling movement of the bearing by maintaining the location of contact inwardly of the outer corner 36 of the adjacent surface 32, while the wedge shaped space is established by configuring surface 32 to the desired convex form. A hydrodynamic fluid lubricating film is produced at the location of contact by constraining the bearing to roll upon the race such that the instantaneous relative velocity between end face 28 and surface 32 adjacent the wedge shaped space 34 includes an inwardly directed component such that rolling movement of the bearing forces lubricating fluid toward the location of contact.

While preferred forms of the invention have been set forth in detail above, the foregoing detailed description should be considered exemplary in nature and not as limiting to the scope and spirit of the invention as set forth in the appended claims.

Having described the invention with sufficient clarity that those skilled in the art may make and use it, I claim:

1. An antifriction bearing assembly comprising:
   an outer circular bearing race;
   an inner circular bearing race concentric with said outer race;
   a plurality of bearing members arranged between said bearing races;
   opposed, upstanding end flanges on said inner race defining a depressed raceway therebetween receiving said bearing members, said bearing members having end faces engagable with the adjacent end flanges; and
   at least one of said end flanges having a convex surface engageable with the adjacent end face of each bearing member to define a wedge shaped space between said convex surface and the adjacent end face disposed radially outwardly of the location of contact between said convex surface and the adjacent end face, said wedge shaped space arranged whereby rolling movement of said bearing member on said depressed raceway forces a lubricating fluid flow into said wedge shaped space to provide a hydrodynamic fluid film between said convex surface and the adjacent end face at said location of contact.

2. An antifriction bearing assembly as set forth in claim 1, wherein the width of said depressed raceway is greater than the width of said bearing members whereby said bearing members are skewed relative to said raceway while rolling thereupon, said location of contact being the leading location of contact between said inner race and each of said bearing members in the direction of rolling movement of the latter.

3. An antifriction bearing assembly as set forth in claim 2, wherein said end faces of said bearing members are substantially flat and perpendicular to said depressed raceway.

4. An antifriction bearing assembly as set forth in claim 3, wherein said end faces on said bearing members are crowned.

5. An antifriction bearing assembly as set forth in claim 2, wherein said bearing members have axially extending cylindrical surfaces between said end faces in rolling engagement with said depressed raceway, the intersections of said cylindrical surfaces with said end faces being smoothly rounded corners.

6. An antifriction bearing assembly as set forth in claim 1, wherein said convex surface is circular with a radius of curvature between approximately 3 inches and 20 inches.

7. An antifriction bearing assembly as set forth in claim 6, wherein said radius of curvature of said convex surface is approximately 5 inches.

8. An antifriction bearing assembly as set forth in claim 1, wherein said convex surface is configured whereby the center of said location of contact is a preselected distance below the outer corner of said convex surface.

9. An antifriction bearing assembly as set forth in claim 8, wherein said convex surface is circular with a predetermined radius of curvature whereby said preselected distance is approximately one-third of the height of said upstanding end flange.

10. In combination with a high speed antifriction roller bearing assembly having an inner race, an outer race, and a plurality of cylindrical roller bearings each having opposed end faces and a cylindrical surface in rolling engagement with said inner and outer races:
    a pair of radially extending flanges on one of said races adjacent the opposed end faces of said bearings, said flanges presenting convexly curved surfaces engageable with said end faces.

11. The combination as set forth in claim 10, wherein the height of said flanges is substantially less than the radius of said bearings.

12. A method of reducing wear between the end face of a roller bearing and an adjacent surface of an upstanding end flange of a circular race having a depressed raceway upon which the bearing rolls, said end face extending outwardly past the outer corner of said adjacent surface of the end flange, said method comprising the steps of:
- establishing an inwardly converging, wedge shaped space between the end face and adjacent surface extending from said outer corner inwardly to the location of contact between said end face and said adjacent surface;
- maintaining said wedge shaped space during rolling movement of the bearing; and
- producing a hydrodynamic fluid lubricating film at said location of contact by constraining the bearing to roll upon the race such that the instantaneous relative velocity between said end face and the adjacent surface in said wedge shaped space includes an inwardly directed component whereby rolling movement of the bearing forces lubricating fluid into said wedge shaped space and toward said location of contact.

13. A method as set forth in claim 12, wherein said establishing step includes configuring said adjacent surface to a convex form.

14. A method as set forth in claim 13, wherein said maintaining step includes maintaining said location of contact inwardly of said outer corner throughout rolling movement of the bearing.

15. A method of lubricating an end face of a roller bearing carried in substantially rolling engagement between concentric inner and outer races, comprising the steps of:
- providing end flanges on one of said races presenting convexly formed end surfaces engageable with opposite end faces of the bearing whereby the leading location of contact of the bearing with said one race in the direction of rolling movement of the bearing is between one of said end faces and the adjacent convex surface;
- maintaining said location of contact inwardly of the outer corner of said adjacent convex surface to establish a wedge shaped space between said one end face and said adjacent convex surface diverging inwardly toward said location of contact; and
- constraining said bearing to roll upon said one race to force lubricating fluid inwardly into said wedge shaped space toward said location of contact to produce a hydrodynamic fluid film between said one end face and said adjacent convex surface at said location of contact.

* * * * *